Feb. 27, 1945.  S. J. BEGUN  2,370,134
TIMING DEVICE
Filed Aug. 21, 1942    4 Sheets-Sheet 1

INVENTOR.
SEMI JOSEPH BEGUN
BY
Eber J. Hyde
ATTORNEY

Feb. 27, 1945.   S. J. BEGUN   2,370,134
TIMING DEVICE
Filed Aug. 21, 1942   4 Sheets-Sheet 3
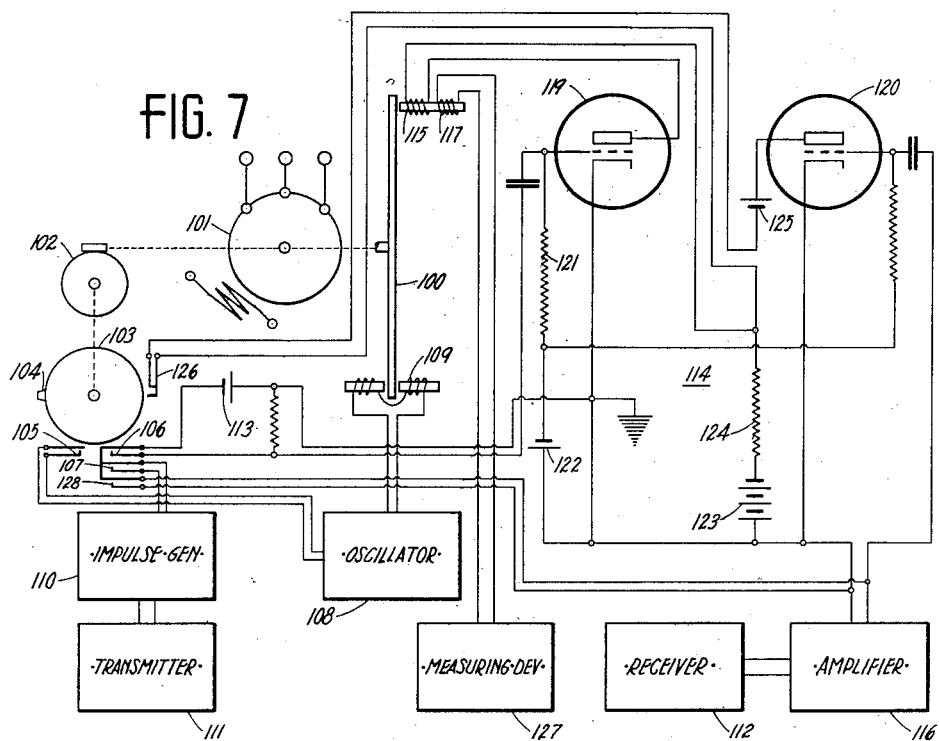
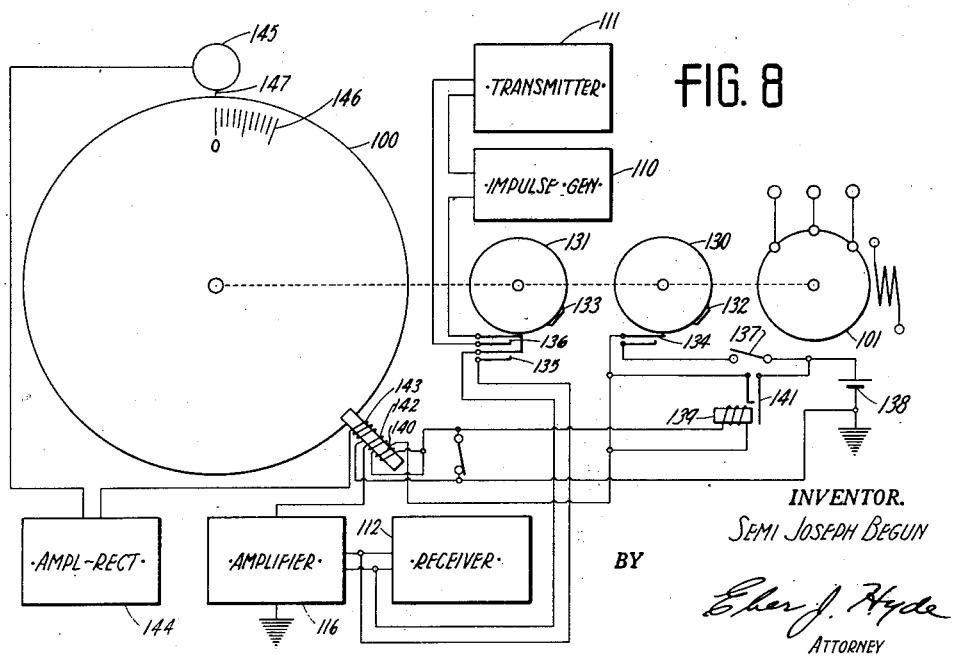
INVENTOR.
SEMI JOSEPH BEGUN
BY
Eber J. Hyde
ATTORNEY Feb. 27, 1945.   S. J. BEGUN   2,370,134
TIMING DEVICE
Filed Aug. 21, 1942   4 Sheets-Sheet 4

INVENTOR.
SEMI JOSEPH BEGUN
BY
Eber J. Hyde
ATTORNEY

Patented Feb. 27, 1945

2,370,134

UNITED STATES PATENT OFFICE 2,370,134

TIMING DEVICE

Semi Joseph Begun, Cleveland Heights, Ohio, assignor to The Brush Development Company, Cleveland, Ohio, a corporation of Ohio Application August 21, 1942, Serial No. 455,646

27 Claims. (Cl. 161—15)

My invention pertains to timing devices, and more particularly to devices adapted to time short intervals with a high degree of accuracy.

An object of my invention is to provide an accurate short interval timing device.

Another object of my invention is to provide a small portable timing device.

A further object of my invention is to provide an accurate timing device wherein the degree of accuracy is constant even though the device is moved from place to place.

It is another object of my invention to provide a timing device the accuracy of which is substantially independent of mechanical means.

It is also an object of my invention to provide a timing device for quickly giving an accurate indication of a short time interval.

Another object of my invention is to provide a method of and the means for measuring the duration of long time intervals with the same high degree of accuracy with which I measure short time intervals.

Other objects and a fuller understanding of my invention may be had by referring to the following specification and the accompanying drawings in which:

Figure 7 illustrates a timing device for measuring such distances as the depth of the ocean.

Figure 8 illustrates another device for measuring depths and distances.

This application is related to Frederick J. Hooven's application Serial Number 469,237, for a Timing device, wherein an alternating signal is recorded on a moving record member during an interval to be timed, and thereafter the record is repeatedly reproduced to establish an alternating electrical signal which is applied to a calibrated meter for giving an indication of the duration of the time interval. In the Hooven device the rate of oscillation of the alternating signal which is recorded need not be known or accurately controlled as to frequency.

This application is also related to Otto Kornei's application Serial Number 447,985, Means for and a method of measuring; and to my previous application Serial Number 437,395, Means for and a method of timing.

This application is primarily directed to means for obtaining the measurement of a time interval having a duration longer than time necessary for one cycle of the signal storage member; and to the feature of utilizing a biased electronic element whereby electrical signals corresponding to noise on the unrecorded portion of the record track on the signal storage member are prevented from actuating a time interval indicating device; and to the combination of the aforementioned biased electronic element with an amplifier which strongly amplifies the reproduced signal which is to be supplied to the indicating device and "chopping off" the peaks of the strongly amplified signal to improve the accuracy of the system.

Figure 1:
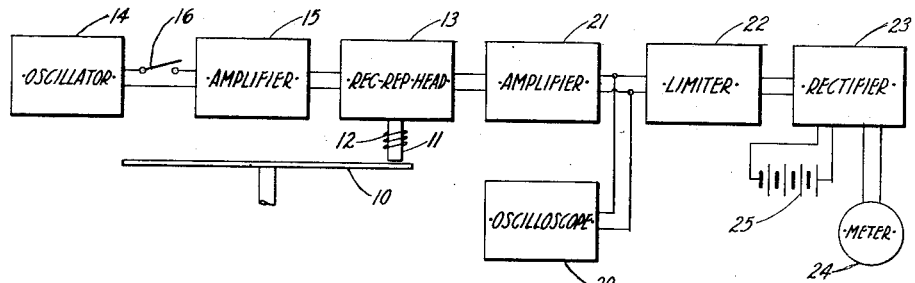
Figure 1 is a block diagram illustration of a form of my invention.

Figure 1 illustrates in block diagram form a system for indicating a time interval in which reference character 10 represents a moving record member such for example as an endless magnetizable tape or disk of magnetizable material which is moving at a known and constant rate of speed. Positioned near the moving magnetizable material is a magnetic head indicated generally by the reference character 13 and comprised of a pole piece 11 which is in magnetic flux linkage relationship with the disk 10, and a coil 12 wound around the pole piece 11. An oscillator 14 is provided and its signal output is amplified by the amplifier 15 and is connected to the coil 12 of the magnetic head 13. Between the oscillator 14 and the amplifier 15 there is a switch 16 which is operated by a trigger circuit in accordance with the interval to be timed. The trigger circuit is preferably electronic and may be fired by any relay action, by photoelectric cells, or by bridge circuits, etc. It is also obvious that a mechanical trigger circuit could be used if it was desired, but mechanical actuation of the switch 16 may be less rapid and accurate than electronic actuation. An interval is timed by the trigger circuit closing switch 16 at the beginning of the interval, thereby establishing on the moving disk 10 a magnetic record of a number of oscillations of the oscillator 14. During this process the magnetic head 13 is a recording head and the signal current from the amplifier 15 passing through the coil 12 establishes a varying magnetic flux in the pole piece 11 and in the disk 10 which is passing close to the pole piece. The length of the record made on the disk 10 is directly proportional to the length of time the switch 16 was closed, and as this length of time was governed by the interval controlled trigger circuit the length of the record on the disk 10 must be directly proportional to the length of the interval to be timed.

Several methods of determining the length of the time interval from the record member 10 may be used. One of them comprises the steps of repeatedly reproducing the record from the disk 10 to establish a signal which is amplified by the amplifier 21, and then applying the amplified output signal to an oscilloscope 20 and there counting the number of cycles of the oscillator which were recorded. This process was shown, described, and claimed in my application Serial No. 437,395. The basis for accuracy in this system is the accuracy and stability of the oscillator. The number of oscillations per second must be known.

Another method of determining the length of the time interval from the record member is to know the rate of rotation of the record member during the recording process and to determine by some means the ratio between the length of recorded signal and the total length of the recording track on the disk 10.

In order to determine the length of the recorded portion of the signal track on the disk 10, the coil 12 is disconnected from the recording circuit and is connected to the reproducing circuit thereby establishing the head as a reproducing head. The disk is driven past the pole piece 11 at a constant rate of speed, and the magnetic pattern in the disk will establish in the pole piece 11 a varying magnetic flux which induces in the coil 12 an electromotive force. The electromotive force generated in the coil 12 is amplified by the amplifier 21, and the amplified output is passed through one or more limiters 22 which "chop off" the peaks of each half wave length in order to reduce error due to variable amplitudes of the reproduced wave. The limited wave is then fed into a full wave rectifier 23 and from there to a current averaging meter 24 such, for example, as a milliammeter. Each revolution of the disk 10 causes an amount of current to be applied to the meter for a period of time which bears a direct relationship to the length of the magnetic pattern on the disk and it therefore has a direct relationship to the length of the interval to be timed. Because the meter 24 is of the averaging type the hand will give a steady indication after a few revolutions of the magnetizable material. The scale on the face of the meter may be divided into units of time.

Two sources of error or inaccuracy may exist in this system. The first may be due to the variable amplitudes of successive cycles of the reproduced wave brought about by causes such as variations in the magnetizable disk 10. To reduce the error which may be due to this, I greatly amplify the signal "picked up" from the disk 10 and pass the amplified signal through the limiter 22 before it reaches the meter 24, thus obtaining signals of the same amplitude and approximately the same shape. Another source of error which may exist in this system is a meter reading arising from background noise which is always present in recording and reproducing systems. Background noise on the unrecorded portion of the disk will cause the meter to indicate a value which is erroneous, and background noise superposed on the signal corresponding to the interval to be timed will also introduce error. The error due to background noise superposed on the signal will be greatly reduced due to the action of the amplifier 21 and the limiter 22, but the other error remains undiminished. In order to reduce this other error I provide a detector 23 between the head 13 and the meter 24, which is so biased by battery 25 that any signals which are stronger than the background noise will be rectified, and the voltages caused by the background noise itself will be below the cut-off voltage of the rectifier.

The averaging meter 24 has previously been calibrated by recording the current output of the oscillator 14 on the disk 10 for a known portion of one revolution of the disk and then reproducing the signal through the limiter 22 and the detector 23 to the meter 24. The signal recorded on the portion of the disk 10 will cause the hand of the meter to read a certain value; if, for example, the known portion which was recorded on the disk 10 was the entire length of the recording path on the disk, the meter can be adjusted to read 100 units. The duration of the interval to be timed must be not longer than the duration for one complete revolution of the disk 10. Accordingly, the record on the disk 10 established by the interval to be timed will extend over less than the entire length of the recording path on the disk, and when the record is reproduced and the output signal applied to the meter 24, the hand will indicate some value less than 100 units; say for example 50 units. The portion of the disk on which a recording was made is therefore ½, and knowing the rate of rotation of the disk 10; say for example 60 revolutions per second, the duration of the time interval may be determined to be $\frac{1}{120}$ of a second. It is obvious that the scale for the meter may directly indicate the time interval. That is, instead of reading 100 units or 50 units the hand would indicate $\frac{1}{60}$ of a second and $\frac{1}{120}$ of a second. The accuracy of this system depends primarily upon the rotation of the magnetizable record material at a known and constant rate, and the constancy of the oscillator is of secondary importance although it is advisable to use one which is fairly constant.

Another manner of reproducing the signal from the disk 10, and in which the rate of rotation of the disk is immaterial so long as it is constant, is to calibrate the meter 24 by reproducing the signal into the oscilloscope and counting the number of cycles which were recorded. If the meter deflects 100 divisions for 100 cycles of the oscillator, and the rate of oscillations is known as, for example 100,000 cycles per second, the time interval the meter reads will be one millisecond, and each meter division would represent 10 microseconds. After the meter has been calibrated the subsequent readings may be made without first applying the signal to the oscilloscope 20 and a great saving of time will be effected. This system uses "cycle counting" for calibrating the meter 24, and thereafter uses an integrating process for obtaining the indication.

Another method which may be used for calibrating the meter 24 is to apply a signal corresponding to a known time interval to the recording circuit, and repeatedly reproducing the disk record caused by the known time interval to establish a reproduced signal. The reproduced signal can then be limited, rectified, integrated and the value read on the scale of the meter. The deflection of the meter hand caused by t..e known time interval calibrates the meter, and subsequent deflections for unknown time intervals can then be directly read on the meter.

Figure 2:
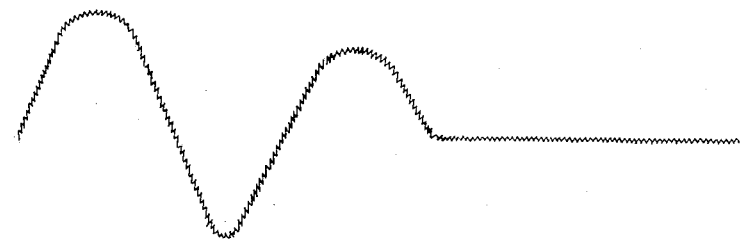
Figures 2 to 4 show diagrammatically the action of my invention on a sinusoidal wave.
Figure 3:
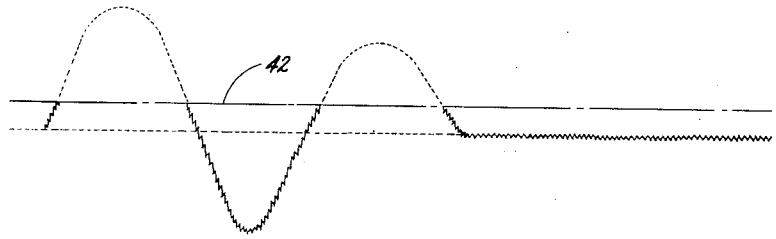
Figure 4:
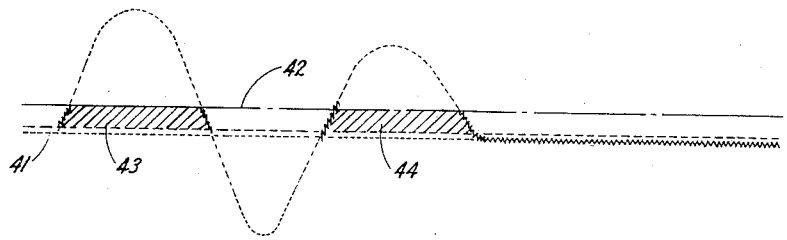

Figures 2 to 4 illustrate diagrammatically the action of my invention on a wave which is reproduced from the magnetic impression made in the magnetizable recording material and which has amplitude variations. These variations result from the differences in the magnetic characteristic of the magnetizable material for different points along the path of recording. This variation in amplitude is illustrated in exaggerated form in Figure 2 by showing the first cycle of greater amplitude than the subsequent cycles, and the background noise is illustrated by the waviness in the line. The signal shown in Figures 2, 3, and 4 is not sinusoidal because I am recording on a saturated magnetizable material without using a polarizing current, thereby causing one-half of the signal to be in the saturation range. A sinusoidal wave could have been recorded by using a neutralized tape, or by using a saturated magnetizable material and a polarizing current.

In Figure 3 the action of the limiter is shown. The limiter "chops off" and flattens the peaks of every other half cycle.

The portion of the signal above the line 42 is effectively eliminated, and accordingly the inaccuracy due to the amplitude variation is greatly reduced.

The rectifier action is illustrated in Figure 4. The half-cycles of the signal which are not subjected to the limiter action are "chopped off" and thrown away, and due to the bias on the rectifier the amount of the signal discarded can be adjusted to include all or substantially all of the background noise on the unrecorded portion of the signal track. In Figure 4 this bias value is illustrated by the line 41. The shaded portions 43, 44 comprise the signal which is passed to the averaging meter 24.

Figure 5:
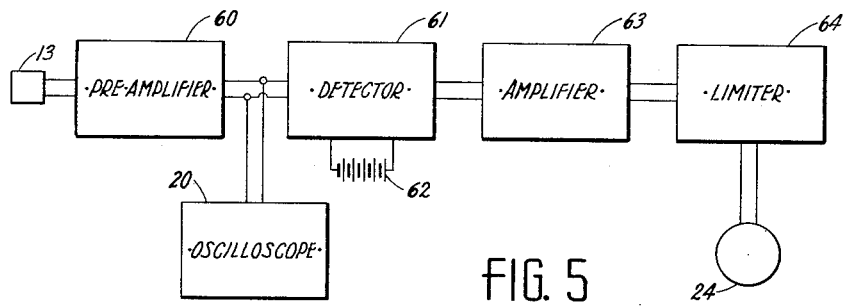
Figure 5 illustrates a circuit which may be used in place of the circuit shown in Figure 1.

Figure 5 illustrates diagrammatically another circuit which may be used in my device in place of the reproducing circuit shown in Figure 1. The signal from the reproducing head 13 passes to a preamplifier 60 and then to a detector 61 which is so biased by a battery 62 as not to be affected by the background noise signal at the portions of the disk where no recording is made, thereby reducing error due to the background noise on the magnetizable material. The signal which leaves the detector 61 corresponds to the recorded signal only, but on this signal is superposed a small amount of noise signal. From the biased detector 61 the signal passes to the amplifier 63 and then to the limiter which reduces error due to the amplitude variation, and then to the averaging meter 24. On this limited wave the residual effect of the background noise superposed on the recorded signal is greatly reduced.

It is desirable for best results that the frequency of the oscillator should be such as to give the best signal to noise ratio. For some materials and speeds of the signal carrier this frequency may be in the range of 10,000 cycles per second. In some devices it is conceivable that this best frequency cannot be used. In such a case equalization may be used if it is needed.

Figure 6:
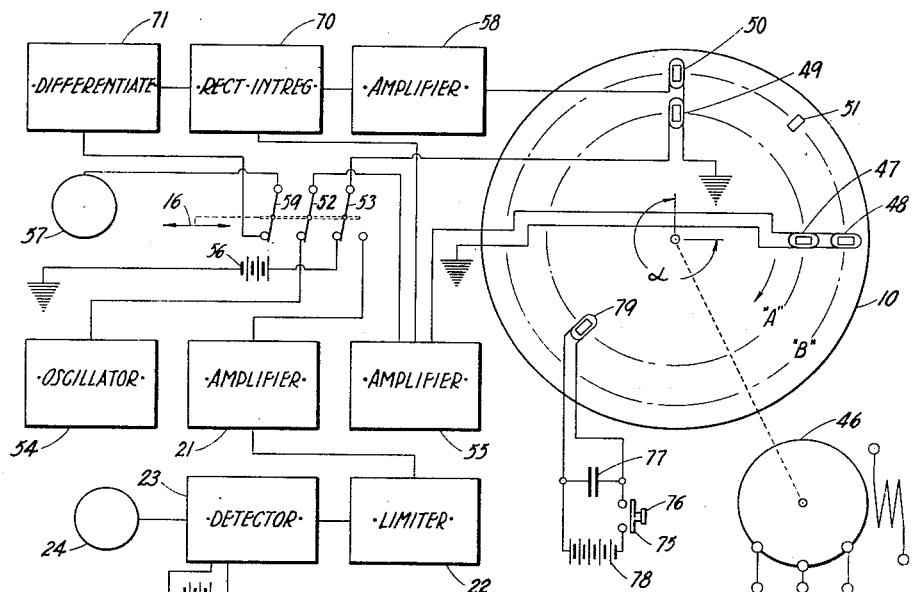
Figure 6 illustrates a timing device adapted to time long intervals.

The timer arrangements described have the disadvantage that they do not permit the measuring of a time interval longer than the time for the magnetizable material to make one complete revolution. For many uses this may be a disadvantage. Accordingly, I provide a means for and a method of accurately timing intervals which are long compared to the time of one revolution of the record material. In Figure 6 there is shown a disk 10 of magnetizable material which is rotated at a known and constant rate of speed by a motor 46. Associated with the disk 10 are two magnetic recording heads 47, 48, and two reproducing heads 49, 50. The recording head 47 and the reproducing head 49 are located on track A on the disk 10, and the reproducing head 49 is adapted to "pick-up" the signal which the recording head 47 impresses on the disk, and the recording head 48 and reproducing head 50 are on track B and are adapted to cooperate in the same manner. An obliterating head 51 is positioned between the reproducing head 50 and the recording head 48, and extends only across track B, thus preparing the track for a new record. The reproducing head 49 also serves part time as an obliterating head.

When an interval is to be timed the motor 46 is started and the disk 10 is driven at a known and constant rate of speed. Switches 52 and 53 are normally open. At the start of the interval to be timed switch 52 is closed thereby connecting the output signal from the oscillator 54 through the amplifier 55 to both recording heads 47, 48. Switch 53 is also closed thereby connecting the battery 56 to the head 49 thereby making head 49 an obliterating head. During the time that it takes the disk 10 to rotate through the angle $\alpha$ both of the recording heads 47, 48 are recording the signal from the oscillator 54. When the magnetic pattern of the signal recorded by head 48 on track B reaches the reproducing head 50, an electromotive force is generated which is amplified by the amplifier 58, and the output is used to actuate the counter 57 and to reduce the gain in the amplifier 55 to prevent the heads 47, 48 from further recording for an interval of time $t$ equal to the length of time it takes the disk to rotate through the angle $\alpha$. When the magnetic pattern which was recorded on track A reaches the head 49 it is obliterated by magnetic flux set up by a current from battery 56.

The signals recorded on tracks A and B of the magnetizable disk 10 are alternating signals as they were derived from the oscillator 54. The reproducing head 50 establishes an alternating electromotive force which blocks the amplifier 55 thereby preventing the further recording of a signal on the disk 10 for an interval of time $t$ equal to the length of time it takes the disk to rotate through angle $\alpha$.

Accordingly, reproducing head 50, after the start of an interval to be timed, does not pick up any signal for the time $t$. Then for a period of time $t$ it picks up a signal. For the next period $t$ no signal is picked up etc. It will be seen that the head 50 picks up a signal in the time intervals $t$ to $2t$, $3t$ to $4t$, $5t$ to $6t$, etc., but does not pick up a signal in the time intervals 0 to $t$, $2t$ to $3t$, $4t$ to $5t$, etc.

From the amplifier 58 the signal passes to a rectifying and integrating device 70 to establish substantially a D. C. pulse having a duration corresponding to the duration of the alternating signal. This D. C. pulse blocks amplifier 55 and is also fed to a differentiating device 71. The output signal from the differentiating device consists of a series of pulses occurring at time intervals $t$, $2t$, $3t$, $4t$, $5t$, etc., and each pulse causes the counter 57 to move one step for each period of time during which the disk rotates through the angle α. The counter starts with a reading of 0(+) and the first pulse actuates the counter to cause it to indicate 2(—). The second pulse causes the counter to indicate 2(+). The third pulse causes the counter to indicate 4(—). The fifth pulse causes the counter to indicate 6(—)—etc.—. Unless the interval to be timed is exactly as long as the length of time for a whole even number of revolutions of the disk 10 through the angle α there will be a signal recorded on track A which has not been obliterated by the head 49. The duration of this signal must be added to or subtracted from the interval indicated on the counter 57. The duration of this signal will be indicated on the scale of the indicating device 24, and will be subtracted from the counter indication if the counter says (—), and added to the counter indication if the counter says (+).

The head 49 serves as an obliterating head only during the interval to be timed. During the first time interval $t$ the obliterating head 49 will be energized by the battery 56 but will not obliterate a signal from track A as there is no signal recorded on that portion of track A which is passing head 49. During the second time interval $t$ the head 49 will obliterate the signal from track A. During the third time interval $t$ there will be no signal obliterated etc.

At the end of the interval to be timed the switches 52 and 53 are simultaneously thrown by the trigger circuit to break the contact between the oscillator 54 and the recording heads 47, 48 thereby terminating all recording, and to break the contact between the battery 56 and the obliterating head 49 thereby terminating the obliterating function of head 49, and to make a contact from the head 49 to the amplifier 21 thereby establishing the head 49 as a reproducing head. Simultaneously with the throwing of switches 52, 53 the switch 59 is thrown to break the circuit from reproducing head 50 to the counter 57 in order that there will be no further actuation of the counter which could arise from the end of the signal recorded on track B passing through the head 50. Without switch 59 the signal, if it occurred sometime during 2, 4, 6, or 8$t$, would establish a pulse which would actuate the counter 57, thereby introducing an error.

For reasons of simplicity I have shown switches 52, 53, and 59 as mechanical and actuated by the trigger circuit switch 16, but it is to be understood that electronic switches may be used, as a more rapid action could be obtained thereby reducing the amount of error due to time lag in switching.

The signal which was recorded on track A and was not obliterated by head 49 before switch 53 was opened will, upon repeatedly rotating it past the pickup head 49, establish an electromotive force. The electromotive force is amplified by the amplifier 21, and passes through the limiter 22 and the detector 23, and is applied to the calibrated current averaging device 24 as has been previously described.

The time interval is measured by algebraically combining the readings on the counter 57 and meter 24. The counter indicates whole time intervals $t$, and the meter 24 indicates a portion of a time interval $t$. The meter indication is to be added to the counter indication if the counter says (+) and is to be subtracted from the counter indication if the counter says (—).

In order that my device may be clearly understood the successive operations will be described in connection with timing a given interval. For example: Suppose it is desired to time an interval of 275 microseconds, and the time of one revolution of the disk 10 is 100 microseconds. It is apparent that the time for the disk to rotate through the angle α is 75 microseconds. Before the start of the interval to be timed switches 59, 52, and 53 are open, the disk 10 is rotating, and the oscillator 54 is operating.

At the start of the interval to be timed switches 59, 52, and 53 are simultaneously closed thereby connecting the counter 57 (which registers 0+) to the reproducing head 50 and connecting the battery 56 to the head 49 to establish it as an obliterating head, and connecting the oscillator 54 to the recording heads 47, 48 to initiate recording on both tracks A and B. After 75 microseconds the front of the record on track B starts to pass reproducing head 50 thereby simultaneously initiating two actions. One action causes the counter 57 to change its reading from 0+ to 2—, and the other is to block the amplifier 55 to stop the recording on tracks A and B. As long as a signal passes head 50 there will be no recording by heads 47, 48. At the same time that the start of the signal on track A reaches reproducing head 50 the start of the signal on track B reaches the obliterating head 49. The record on track 49 will be obliterated for 75 microseconds until the end of the signal on track B passes head 50, at which time amplifier 55 is unblocked and recording is again started at heads 47, 48, and the counter 47 is actuated to read 2+. By this time 150 microseconds have elapsed. For the next 75 microseconds heads 47, 48 record on tracks A and B and when the front ends of the records reach heads 50 and 49 the counter is moved to 4— and the recording by heads 47, 48 is again blocked. 225 microseconds have now elapsed. For the next 50 microseconds until the switch 53 is opened by the end of the interval to be timed the obliterating head 49 obliterates the record on track A, thereby leaving a record only 25 microseconds long on track A. The end of the interval to be timed also opens switches 59 and 52. Switch 53 connects the head 49 to the meter 24 and it now functions as a reproducing head. Upon repeatedly reproducing the record remaining on track A the meter 24 will indicate 25 microseconds, and because the counter read 4— the 25 microseconds will be subtracted from 300 microseconds (4×75=300) to give an interval time of 275 microseconds.

A condenser discharge type of obliterating device may be provided for rendering the magnetic condition of track A uniform before a new interval is timed. Normally the switch 75 is open. After an interval has been timed and the operator desires to clear track A, he presses push button 76 thereby closing switch 75 and connecting the battery 78 to the coil of the obliterating head 79. The current from the battery 78 is sufficient to saturate the portion of the disk 10 which is under the obliterating head 79 and is applied for at least one revolution, and when the push button is released the condenser 77, which has been charged by battery 78, discharges through the coil of the obliterating head thereby gradually reducing the flux which is applied to the magnetizable disk 10. This type of obliteration due to the condenser discharge does not leave a sharp change in the amount of magnetization in the portion of the disk which was under the head 79 when the switch 75 was opened, thereby preventing the actuation of the counter 87 by the sharp change in magnetization.

A use to which my device may be put is to measure the time which elapses between transmitting a signal toward a reflecting surface and receiving the reflected echo of the signal. Important applications of this system are measuring altitude, measuring the depth of water, and determining the distance a submarine body is from the operator. A convenient system is described in Figure 7 in which a magnetizable disk 100 is rotated by the motor 101 at a uniform rate of speed. The motor 101 is provided with reduction gears 102 and a cam disk 103 which has a raised portion 104. The gear reduction system is such that the cam disk 103 makes one revolution for several hundred revolutions of the magnetizable disk 100. The raised portion 104 controls the opening and closing of three switches 105, 106, and 107 which are normally biased to their open position. The obliterating switch 105 makes and breaks a circuit in the obliterating oscillator 108 which feeds the magnetic obliterating head 109. When the raised portion 104 on the cam disk 103 closes the switch 105 current flows from the oscillator 108 through the windings of the obliterating head 109 thereby establishing a magnetic flux through the disk 100 which saturates the portion of the disk which is between the two pole pieces of the obliterating head, and as that saturated portion of the disk moves away from the obliterating head the intensity of the magnetic field gradually is reduced. Due to the alternating characteristic of the current through the obliterating head and the gradual decrease in the intensity of the magnetic field as each incremental portion of the disk 100 moves away from the pole pieces, each portion of the disk which has passed between the pole pieces is demagnetized to substantially its virgin magnetic state. The switch 105 must be held closed for a length of time which is greater than the length of time for one revolution of the magnetizable disk 100, and then released to prevent further obliteration. Arrangements may be made in the oscillator 108 so that when switch 105 is opened an abrupt breaking of the current to the head 109 is avoided.

After the magnetizable disk 100 has been obliterated the raised portion 104 simultaneously closes the switches 106, 107 and 128 each of which is held closed for only a very short interval of time. The switch 107 makes a circuit through the impulse generator 110 which causes a short signal to be sent out from the transmitter 111 toward the distant object which reflects the signal back to the receiver 112. Switch 128 short circuits the amplifier 116 during the transmission of the pulse so that the direct signal will not affect the trigger circuit 114. Simultaneously with the closing of switch 107 the switch 106 is also closed thereby connecting the battery 113 to the trigger circuit which is indicated generally by the reference character 114, initiates the triggering and causes a current to flow in the recording coil 115. When the reflected signal arrives at the receiver 112 it is amplified at the amplifier 116 and an impulse is applied to the trigger circuit 114 to stop the current in the recording coil 115. Between the time the impulse was sent out of the transmitter 111 and the time the reflected signal was received at the receiver 112 a signal was being recorded on the rotating disk 100. Knowing the rate of rotation of the disk 100 the length of time can be determined by repeatedly reproducing the signal to establish a current in the reproducing coil 117 which is applied to a measuring device 127 which, for the device shown in Figure 7, may be a circuit similar to that shown in Figure 10, or if an alternating current had been recorded on the disk 100, a reproducing circuit similar to those shown in Figure 1 or 5 could have been used.

One suitable trigger circuit 114 is described in Electronics, November, 1940, page 29, in which two thyratron tubes 119 and 120 are used. To begin with no current flows through the tubes because of the negative voltage applied to their grids through resistance 121 from battery 122. When the switch 106 is closed by the raised portion 104 on disk 103 the positive bias applied by battery 113 through the condenser biases the thyratron tube 119 allowing a current to flow from the batter 123 through resistance 124. This current flows through the recording coil 115 and establishes a magnetic pattern on the rotating disk 100. When the reflected signal is received at 112 and amplified a positive impulse is applied to the grid of tube 120 thereby firing it and connecting batteries 123 and 125 in series through resistance 124 and tube 120. This results in an increase of voltage drop across the terminals of resistor 124, and lowers the potential of the plate of tube 119 to the point where it extinguishes, thus cutting off the current through the recording coil 115 and stopping the recording. A switch 126 is provided in the plate circuit of the tube 120, and is opened by raised portion 104 of the disk 103 after the timing operation has been completed, thereby breaking the bias on the tube and restoring the device to normal from whence a subsequent timing operation can be performed. Obviously, many other different kinds of trigger circuits could be used.

Another device for measuring depths and distances by the reflected echo method is illustrated in Figure 8 in which the motor 101 drives the magnetizable disk 100, and in addition drives two other disks 130 and 131. The disk 130 has a raised portion 132 which closes a switch 134 which is normally biased open, and the disk 131 has a raised portion 133 which closes two switches 135 and 136 both of which are normally biased open. The disk 131 periodically closes the switches 135 and 136 for very short time intervals. For example, the switch 135 may be held closed for 60 miscroseconds and the switch 136 may be held closed for 40 microseconds. The switch 134 is held closed for a somewhat longer time interval. The order of closing is first switch 135 and then simultaneously switches 136 and 134. The order of opening is first switch 136, then switch 135, and finally switch 134. The switch 135 short circuits the input line of the receiver 112 to render the receiver inoperative during the time a signal is being sent out from the transmitter 111. Switch 136 connects the sound source 110 with the transmitter 111 and at the same instant when switch 137 is manually held closed, switch 134 initiates the timing period by starting a recording on the disk 100 by connecting the battery 138 to a winding 140 on the recording head. The echo of the signal transmitted from 111 is received at 112, is amplified by the thyratron amplifier 116, and serves to stop the magnetic recording on the disk 100. The amount of recording on the disk 100 is an indication of the duration of the interval to be timed, and it may be found by repeatedly reproducing the signal from the disk into an averaging meter as has previously been described, or it may be found by stroboscopically flashing a glow lamp such as 145 and reading an angle on the scale face 146 of the disk 100 as is shown and described in connection with Figure 8.

Due to the use of battery 138 to record on the magnetizable material, the magnetic signal will be unidirectional and there will be a rapid increase in the amount of magnetization at the beginning of the magnetic signal corresponding to the beginning of the interval to be timed, and a rapid decrease at the end of the magnetic signal corresponding to the end of the interval to be timed. Between the beginning and the end of the magnetic signal there will be very little change of magnetization in the disk 100. In the reproducing process the reproducing head is only able to establish an electromotive force which is proportional to the rate of change of flux cutting the coil in the head; in other words the reproducing head "picks up" $d\phi/dt$. Each revolution of the disk 100 upon which a unidirectional magnetic signal has been recorded will establish two short electromotive pulses, one corresponding to the beginning of the magnetic signal where the rate of increase of magnetization is high, and the other corresponding to the end of the magnetic signal where the rate of decrease of magnetization is high. These two electromotive pulses will be of opposite polarity as one was established by an increase in magnetization and the other was established by a decrease in magnetization.

By using a glow lamp 145 which will flash under the control of an electromotive force of either polarity I can make the device shown in Figure 8 operative to indicate both the beginning and the end of the interval to be timed by repeatedly rotating the disk 100 thereby repeatedly causing the glow lamp 145 to flash when a certain point on the scale 146 is near the lamp. As the scale is synchronized with the rotation of the magnetizable disk the stroboscopic effect will cause one scale reading to appear to be superposed on another scale reading. The difference between the readings of the two scales is a measure of the amount the magnetizable disk rotated between the start and end of the interval to be timed, and knowing the rate of rotation of the magnetizable disk during recording this angle becomes an indication of the duration of the interval to be timed. If capital T represents the length of time of one revolution of the disk 100 during the recording process, and small $t$ represents the length of time during the interval to be measured and which is less than T, then repeatedly reproducing the signal on the magnetizable disk into an averaging meter gives the ratio $t/T$, and repeatedly reproducing the signal on the magnetizable disk to cause the glow lamp 145 to flash permits measuring an angle $\alpha$ which is the angle through which the magnetizable disk 100 moves in time $t$. In other words I have provided means for measuring either $t/T$ or $\alpha/360°$, either of which will give the length of the interval to be timed if the rate of rotation of the magnetizable disk 100 during recording is known. In the equation $t/T$ the value of T must be known. In the equation $\alpha/360°$ the length of time necessary for the disk to rotate through 360 degrees must be known. This length of time is also T.

To determine, for instance, the depth of the ocean at a certain point the switch 137 is manually closed. Switch 135 short circuits the receiver circuit and upon the raised portion 132 on disk 130 closing switch 134 a circuit is made from battery 138, thereby causing a direct current to flow through the coil of the relay 139 and through the recording coil 140 of the magnetic head. The current in the recording coil 140 causes magnetic flux to pass through the disk 100 and leave a unidirectional pattern on the disk. The current through the coil of the relay 139 causes the contact 141 to close and establishes a parallel circuit to switch 134 and switch 137 and at the same time establishes a holding circuit. At the same time switch 134 is closed to start recording on the disk 100 the switch 136 closes for a short time interval and causes a signal to be sent from the transmitter 111. The receiver 112 is short circuited and accordingly cannot receive a direct signal from the transmitter, but before the echo arrives at the receiver 112 switch 135 is opened. The echo is received at 112 and amplified at 116. The impulse starts the operation of a thyratron from which current is passed through the coil 142 wound about the same pole piece as the recording coil 140, but which is arranged to establish a magnetic flux which is substantially equal to and bucking the flux established by the coil 140. Therefore, as soon as coil 142 becomes energized, the recording on the disk 100 stops. A third winding 143 may be provided for reproducing the record to establish two pulses, one at the beginning of the magnetic record on the disk and the other at the end of the record on the disk. These pulses are amplified by the amplifier 144 and ignite the glow lamp 145. The magnetizable disk 100 is provided with a scale 146 on its face, and the flash of the glow lamp illuminates the disk at two points during each revolution, one at the beginning of the interval to be timed and the other at the end of the interval to be timed. The difference between the two readings is an indication of the duration of the time interval. The device is reset by opening the switch which breaks the recording circuit to coil 140, and simultaneously breaks the circuit from the thyratron through the coil 142, and releasing the relay 141.

By causing the glow lamp to fire momentarily twice during each revolution of the magnetizable disk 100 two scale readings can be obtained by the stroboscopic effect. One of these readings subtracted from the other readings will give an indication of the amount of rotation of the disk 100 during the interval to be timed, thereby giving an indication of the duration of the interval to be timed. Unless precautions are taken error may result from uncertainty as to which flash represented the beginning and which flash represented the end of the interval to be timed. Several methods of distinguishing one flash from the other are shown, described, and claimed in Otto Kornei's co-pending application, Serial No. 447,985. In the device shown in Figure 8 I avoid this possibility of error by causing switches 134 and 135 to be closed at the instant the zero point of the scale 146 on the disk 100 is immediately under the glow lamp 145. The operator will know that the flash of the glow lamp 145 which always occurs when the zero indication of the scale 146 is in line with the mark 147 corresponds to the start of the interval to be timed. Accordingly, the operator will also know that the other flash corresponds to the end of the interval to be timed.

For convenience in making a device of this kind, it is suggested that the functions of the recording amplifier 116 and the reproducing amplifier 144 be combined into one amplifier, and that the transmitter 111 and the receiver 112 be combined into one unit.

In many applications of the above described nature and in which the glow lamp is not fired at a predetermined point on the scale corresponding to the start of the signal, two glow lamps are convenient, one responsive only to the pulse generated in accordance with the start of the magnetic record on the disk 100, and the other responsive only to the pulse generated in accordance with the end of the magnetic record on the disk 100 and a distinguishing feature such as color may be embodied with the lamps. A rectifier which passes only electromotive pulses corresponding to the electromotive pulse established by the reproducing head for the start of the interval to be timed may be connected to a red glow lamp, and a rectifier which passes only electromotive pulses corresponding to the electromotive pulse established by the reproducing head for the end of the interval to be timed may be connected to a green glow lamp. In this manner it is easy to distinguish between the pulse corresponding to the start of the time interval and the pulse corresponding to the end of the time interval.

Figure 9:
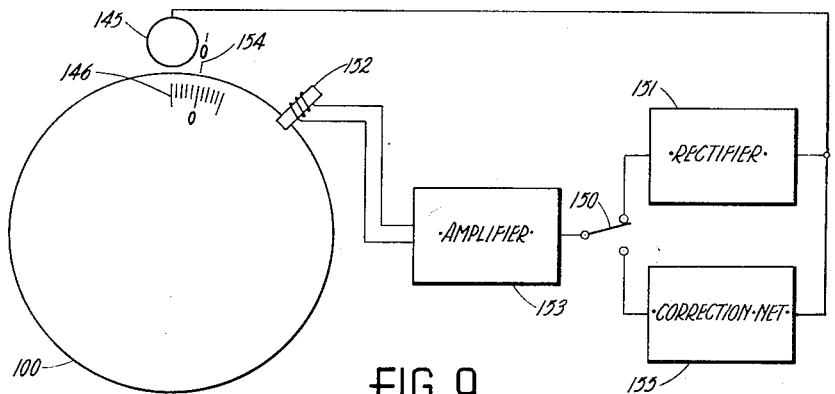
Figure 9 illustrates a circuit for use with some of my other devices whereby certain parts of the devices may be eliminated.

The circuit illustrated in Figure 9 provides a method for eliminating one of the glow lamps and still obtain an accurate and well defined reading. A switch 150 is provided in the playback circuit and the disk 100 is repeatedly rotated past the reproducing head 152 to generate an output signal which is amplified by the amplifier 153. With the switch 150 thrown to connect the input of the rectifier 151 to the output of the amplifier 153, the signal is rectified and the pulse corresponding to the end of the magnetic pattern on the disk 100 is eliminated. Accordingly, the glow lamp 145 flashes only for the pulse corresponding to the beginning of the magnetic pattern. With the glow lamp 145 flashing only for the pulse corresponding to the beginning of the magnetic pattern the reproducing head 152 is moved with respect to the disk 100 until the zero point on the scale 146 of the disk appears under the lamp 145. The switch 150 is then thrown to cut out the rectifier 151. The glow lamp now fires for the pulses corresponding to both the beginning and the end of the magnetic pattern, and two readings will be evident on the face of the disk 100; one corresponding to the start of the interval to be timed will be evidenced by the zero point of the scale 146 being near the glow lamp 145, and the other corresponding to the end of the interval to be timed will be evidenced by a second view of the scale 146 apparently superposed on the first view of the scale 146. The difference between the two scale readings indicates the amount of rotation of the disk 100 during the interval to be timed, and is also an indication of the duration of the interval. A network 155 may be provided to equalize for losses in the rectifier 151.

In order to further avoid any chance of confusion in reading the angle through which the disk 100 rotates during the interval to be timed, a second rectifier can be put in place of the corrective network 155. This second rectifier should cut out the electromotive pulse of polarity opposite the polarity which the rectifier 151 cuts out, thereby causing the glow lamp 145 to flash only for electromotive pulses corresponding to the end of the magnetic signal. The switch 150 is thrown to connect the reproducing head 152 to the glow lamp 145 through the rectifier 151 thereby causing the lamp to ignite in accordance with the start of the magnetic signal on the disk 100. The head 152 is rotated with respect to the magnetizable disk 100 until the zero line of the scale 146 is in line with a mark such as 154 which is stationary. The switch 150 is then thrown to connect the head 152 to the glow lamp 145 through the second rectifier thereby causing the lamp to ignite in accordance with the end of the magnetic signal on the disk 100. With the glow lamp repeatedly flashing under the control of the end of the magnetic signal, the value of an angle will appear opposite the stationary mark 154. This angle is the amount of rotation of the disk 100 during the interval to be timed, and is therefore an indication of the duration of the interval.

Figure 10:
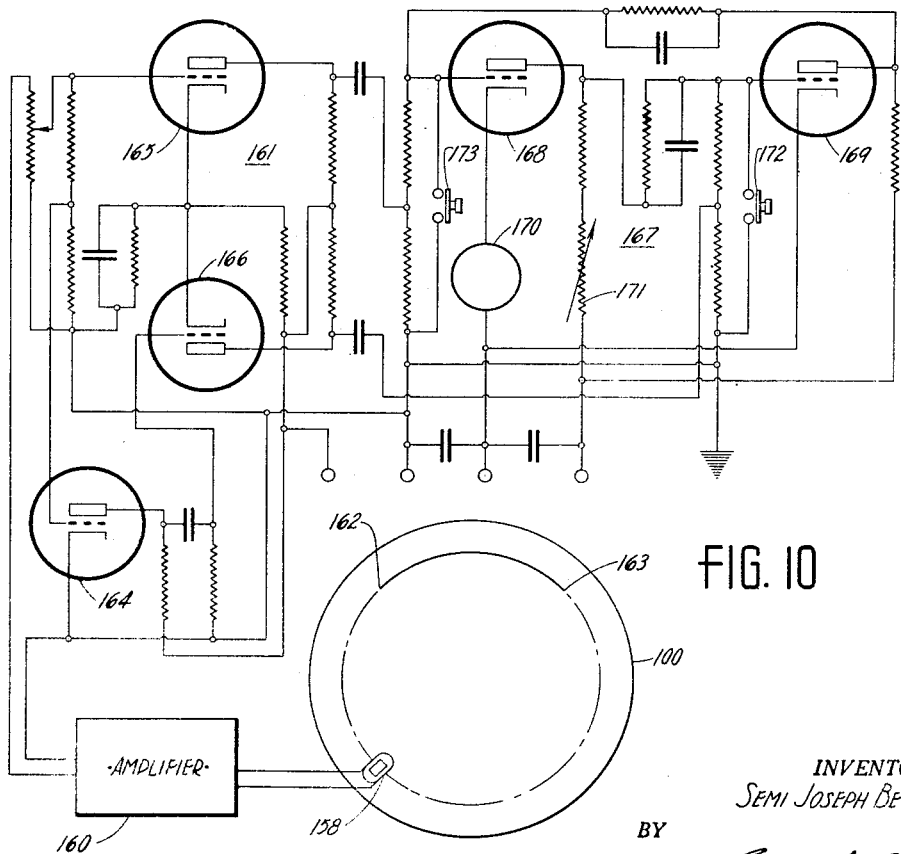
Figure 10 is an illustration of an electronic circuit for timing short intervals.

Instead of using a flashing Strobotron lamp and observing the time duration on a rotating disk, a similar effect can be obtained by using an electronic circuit such as is shown in Figure 10 wherein a pulse corresponding to the beginning of the magnetic pattern on the disk causes a tube to become conducting. An integrating meter in the plate circuit of the tube will indicate the flow of current, and a second pulse corresponding to the end of the magnetic pattern on the disk causes the tube to become nonconducting. The meter therefore will indicate $\int i\, dt$: Since the plate current $i$ can be made constant and the meter will then measure time. The circuit for this device is shown in detail in Figure 10 wherein the reproducing head 158 is associated with the magnetizable disk 100 and establishes an electromotive force substantially in accordance with the rate of change of magnetization in the disk 100. The electromotive force established in the reproducing head 158 is amplified by the amplifier 160 and the output is connected to the Class C amplifier which is indicated generally by the reference character 161. There are two portions 162 and 163 of the magnetic pattern on the disk 100 which exhibit a rapid rate of change, and the first 162 is at the start of the signal and is in the opposite direction from the second 163 which is at the end of the signal. That is, the rate of change 162 is due to a rapid increase in the magnetic flux applied to the previously demagnetized disk 100 by the recording head, and the change 163 is due to a rapid stopping of the magnetic flux applied by the recording head. Due to the fact that they are in opposite directions the two electromotive forces established during each revolution of the magnetizable disk may be made to appear as pulses of opposite polarity. The tube 164 functions as a phase inverter, and tubes 165 and 166 are biased to beyond plate current cutoff. By using tubes 165 and 166 in push-pull the first pulse established by the reproducing head 158 is passed only by tube 165, and the second pulse is passed only by tube 166. The trigger circuit is indicated generally by the reference character 167 and is comprised of two tubes 168 and 169 with their associated circuits, meter 170, and calibrating circuits. Normally the trigger circuit is in such a condition that the tube 168 is nonconducting and tube 169 is conducting. This condition is maintained because the voltage drop in the plate load resistor of tube 169 applies a high negative bias to tube 168, and the absence of plate current through the plate resistors of tube 168 permits a positive bias to be applied to tube 169. The first pulse from the push-pull amplifier 161 applies a positive potential to the grid of tube 168 and current begins to flow through the meter 170. This current produces a voltage drop in the plate resistor of tube 168 and thereby biases tube 169 to cutoff. The second pulse applies a positive potential to the grid of tube 169, and the circuit is restored to normal with tube 168 nonconducting and tube 169 conducting. This entire process is repeated for each revolution of the disk 100, and the meter 170 indicates the length of the magnetic pattern on the disk by measuring the average current through tube 168. The instrument is calibrated by adjusting the calibrating resistor 171 to cause the meter 170 to read full scale when tube 168 is conducting continuously. Pushing the calibrating button 172 biases tube 169 to cutoff thereby making tube 168 the conducting tube, and pushing the restoring button 173 biases tube 168 to cutoff.

Although I have described my invention with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

I claim as my invention:

1. A timing device comprising, in combination, record member means, means for driving the record member means at a known and constant rate of speed, means for providing an oscillating signal, means for controlling the duration of the signal in accordance with the interval to be timed, first and second recording means connected to said oscillator and adapted to record on first and second portions of the record member means two patterns which together bear a direct relationship with the length of the interval to be timed, counting means, first and second reproducing means associated with said two portions of the record member means, the first of said reproducing means establishing a signal which actuates said counting means and periodically blocks said first and said second recording means, and means actuated by said second reproducing means for establishing a correction factor in accordance with the signal recorded on said second portion by said periodically blocked second recording means which together with the indication on the counter means provides substantially an exact indication of the duration of the event timed.

2. A timing device comprising, in combination, magnetizable record member means, means for driving the record member means at a known and constant rate of speed, means for providing an oscillating signal, means for controlling the duration of the signal in accordance with the interval to be timed, first and second recording means connected to said oscillator and adapted to record on first and second portions of the record member means two magnetic patterns, first indicating means, first and second reproducing means associated with said two portions of the record member means for reproducing a signal therefrom, the first of said reproducing means being adapted to establish an electromotive force in accordance with the magnetic pattern on said first portion of said record member means, means connecting said first reproducing means to said first and second recording means to prevent said recording means from recording a magnetic pattern on said record member means while said previously recorded magnetic pattern is passing said first reproducing means, means connecting said first reproducing means to said first indicating means to cause said electromotive force to actuate said first indicating means, second indicating means, means connecting said second reproducing means to said second indicating means for establishing a correction factor in accordance with the signal recorded on said second portion which together with the indication on the first indication means provides substantially an exact indication of the duration of the event timed.

3. A timing device comprising, in combination, magnetizable record member means, means for driving the record member means at a known and constant rate of speed, means for providing an oscillating signal, means for controlling the duration of the oscillating signal in accordance with the interval to be timed, first and second recording means connected to said interval controlled source of oscillating signal and adapted to record on first and second portions of the record member means two magnetic patterns bearing a relationship to the interval to be timed, first and second reproducing means associated with said two portions of the record member means for reproducing a signal therefrom, connection means from one of the said reproducing means to the said recording means to prevent said recording means from recording a magnetic pattern on said record member means while a previously recorded magnetic pattern is passing said reproducing means, current supply means connected to the other of said reproducing means to establish said reproducing means as an obliterating means during the interval to be timed, first indicating means connected to the first of said reproducing means for giving a rough indication of the duration of the interval, second indicating means connected to said second reproducing means for establishing a correction factor in accordance with the signal which was recorded on said second portion of the magnetic member means and which was not obliterated during the interval to be timed, said first and second indicating means together providing substantially an exact indication of the duration of the event timed.

4. The process of measuring a time interval comprising the steps of: providing record member means moving at a known and constant rate of speed, providing a signal, controlling the signal in accordance with the interval to be timed, recording on two portions of the record member means two patterns which bear a relationship to the interval controlled signal, counting whole numbers in accordance with one of said patterns, repeatedly reproducing only the other pattern to determine a fractional number, and utilizing said whole number and said fractional number to provide an indication of the duration of the time interval.

5. The process of measuring a time interval comprising the steps of: providing record member means moving at a known and constant rate of speed, providing a signal, controlling the signal in accordance with the interval to be timed, recording on two portions of the record member means two patterns, said two patterns together bearing a direct relationship to the length of the interval to be timed, utilizing one of said patterns to provide a rough indication of the duration of the interval, and utilizing the two patterns together to provide substantially an exact indication of the duration of the interval to be timed.

6. The process of measuring a time interval comprising the steps of: providing record member means moving at a known and constant rate of speed, providing a signal, controlling the signal in accordance with the interval to be timed, recording on two portions of the record member means two patterns, said two patterns together bearing a direct relationship to the length of the interval to be timed, actuating a counting device in accordance with one of said patterns to provide a rough indication of the duration of the interval, and repeatedly reproducing a portion of only the other of said patterns to establish a corrective value which together with the rough indication provides substantially an exact indication of the duration of the time interval.

7. A timing device comprising, in combination, record member means, means for driving the record member means at a known and constant rate of speed, means for providing a signal, means for controlling the signal in accordance with the interval to be timed, first and second recording means adapted to record on first and second portions of the record member means two patterns which together bear a direct relationship to the length of the interval to be timed, counting means actuated by the first of said patterns to provide a rough indication of the duration of the time interval, and means for repeatedly reproducing a portion of only the second pattern to establish a correction value which together with the rough indication provides substantially an exact indication of the duration of the time interval.

8. A timing device comprising, in combination, record member means, means for driving the record member means at a known and constant rate of speed, means for providing a signal, means for controlling the signal in accordance with the interval to be timed, first and second recording means adapted to record on first and second portions of the record member means two patterns which together bear a direct relationship to the length of the interval to be timed, counting means actuated by the first of said patterns to provide a rough indication of the duration of the time interval, indicating means actuated by a portion of only the second of said patterns to establish a correction value which together with the rough indication provides substantially an exact indication of the duration of the time interval, and control means connected to said counting means and to said second recording means for influencing the said second pattern in accordance with the said first pattern.

9. In a timing device, a record member, means for cyclically driving the record member at a known and constant rate of speed, recording means associated with said record member, a source of alternating signal connected to said recording means, means for controlling the duration of the signal applied to said recording means in accordance with the duration of the interval to be timed, reproducing means associated with said record member for reproducing the signal recorded thereon once during each of a succession of cycles of motion of said record member past said reproducing means, calibrated signal averaging means, and electronic means connected to said reproducing means and to said signal averaging means, said electronic means including the following elements, an amplifier for amplifying the signal obtained from said reproducing means and a limiter for limiting the peaks of said amplified signal, at least one of said elements being biased to cause the element to pass only signals above a certain amplitude.

10. In a timing device, a record member, means for cyclically driving the record member at a known and constant rate of speed, recording means associated with said record member, a source of alternating signal connected to said recording means, means for controlling the duration of the signal applied to said recording means in accordance with the duration of the interval to be timed, reproducing means associated with said record member for reproducing the signal recorded thereon once during each of a succession of cycles of motion of said record member past said reproducing means, calibrated signal averaging means, and electronic means connected to said reproducing means and to said signal averaging means, said electronic means including the following elements, an amplifier for amplifying the signal obtained from said reproducing means, a limiter for limiting the peaks of said amplified signal, and a rectifier, at least one of said elements being biased to cause the element to pass only signals above a certain amplitude.

11. The invention as set forth in claim 10, further characterized in this: that it is the said rectifier which is biased to pass only signals above a certain amplitude.

12. The invention as set forth in claim 9, further characterized in this: that the said certain amplitude above which the element passes signals is chosen in accordance with the magnitude of the background noise of the system such that substantially no signal corresponding to the said background noise is passed to the signal averaging means.

13. A timing device comprising, in combination, a magnetizable record member, means for cyclically driving the record member at a known and constant rate of speed, magnetic recording means associated with said record member, a source of alternating signal connected to said recording means, means for controlling the duration of the signal applied to said recording means in accordance with the duration of the interval to be timed, magnetic reproducing means associated with said record member for reproducing the signal recorded thereon once during each of a succession of cycles of motion of said record member past said reproducing means, calibrated signal averaging means, and electronic means connected to said reproducing means and to said signal averaging means, said electronic means including the following elements, an amplifier for amplifying the signal obtained from said reproducing means and a limiter for limiting the peaks of said amplified signal, at least one of said elements being biased to cause the element to pass only signals above a certain amplitude.

14. A timing device comprising, in combination, a magnetizable record member, means for cyclically driving the record member at a known and constant rate of speed, magnetic recording means associated with said record member, a source of alternating signal connected to said recording means, means for controlling the duration of the signal applied to said recording means in accordance with the duration of the interval to be timed, magnetic reproducing means associated with said record member for reproducing the signal recorded thereon once during each of a succession of cycles of motion of said record member past said reproducing means, calibrated signal averaging means, and electronic means connected to said reproducing means and to said signal averaging means, said electronic means including the following elements, an amplifier for amplifying the signal obtained from said reproducing means, a limiter for limiting the peaks of said amplified signal, and a rectifier, at least one of said elements being biased to cause the element to pass only signals above a certain amplitude.

15. The invention as set forth in claim 14, further characterized in this: that it is the said rectifier which is biased to pass only signals above a certain amplitude.

16. The invention as set forth in claim 13, further characterized in this: that the said certain amplitude above which the element passes signals is chosen in accordance with the magnitude of the background noise of the system such that substantially no signal corresponding to the said background noise is passed to the signal averaging means.

17. The process of measuring the duration of a time interval comprising the steps of providing a record member, cyclically driving the record member at a known and constant rate of speed, providing a source of alternating signal, controlling the duration of the alternating signal in accordance with the duration of the interval to be timed, recording on said record member a signal bearing a relationship to the duration of the interval controlled signal, repeatedly reproducing the recorded signal during successive cyclic motions of said record member, amplifying the reproduced signal, limiting the peaks of the amplified signal, providing calibrated signal averaging means, and passing to said calibrated signal averaging means only that portion of the amplified and limited reproduced signal which exceeds a certain value whereby erroneous actuation of said signal averaging means due to background noise is reduced.

18. The process as set forth in claim 17, further characterized in this: that the said reproduced signal is also rectified before it is applied to the said signal averaging means.

19. The process as set forth in claim 17, further characterized in this: that the said reproduced signal is also rectified before it is applied to the said signal averaging means, and the rectifier means is biased to pass to the calibrated signal average means only that portion of the amplified and limited reproduced signal which exceeds the said certain value.

20. The process as set forth in claim 17, further characterized in this: that the said record member is a magnetizable member and the recording and reproducing steps are steps of magnetically recording and reproducing.

21. The process of measuring a time interval comprising the steps of: providing a record member, providing means for recording a signal on said record member, establishing a known and constant rate of relative motion between said record member and said recording means, providing a signal, controlling the signal in accordance with the duration of the interval to be timed, recording the controlled signal on said record member while there is relative motion between said record member and said recording means, repeatedly reproducing the record from the record member to establish a reproduced signal, amplifying the reproduced signal, detecting the reproduced signal, limiting the amplitude of the amplified reproduced signal, providing calibrated signal averaging means, and passing to said signal averaging means only that portion of the amplified, limited, and detected reproduced signal which exceeds a certain value whereby erroneous actuation of said signal averaging means due to background noise is reduced.

22. The invention as set forth in claim 21, further characterized in that the record member is magnetizable and said recording and reproducing steps are steps of magnetically recording and reproducing.

23. The invention as set forth in claim 21, further characterized in that the duration of the signal which is provided is controlled in accordance with the duration of the interval to be timed.

24. The process of measuring a time interval comprising the steps of: providing record member means, cyclically driving the record member means at a known and constant rate of speed, providing an electrical signal, controlling the duration of the electrical signal in accordance with the duration of the interval to be timed, recording on two portions of the record member means at least two signals derived in accordance with the interval controlled electrical signal, indicating time intervals of a known duration in accordance with at least one of said recorded signals, and repeatedly utilizing at least the other of said recorded signals to measure a time interval shorter than the interval of known duration, the duration of said interval to be measured being determined with a high degree of accuracy by utilizing together the indication of said intervals of known duration and said indication of the shorter time interval.

25. The process as set forth in claim 24 wherein the indication of the said shorter interval is algebraically added to the sum of the said time intervals of known duration.

26. The process as set forth in claim 4, further characterized in that the signal is magnetically recorded and reproduced.

27. The process as set forth in claim 5, further characterized in that the signal is magnetically recorded and reproduced.

SEMI JOSEPH BEGUN.